(12) United States Patent
Sethi et al.

(10) Patent No.: US 11,687,793 B2
(45) Date of Patent: Jun. 27, 2023

(54) USING MACHINE LEARNING TO DYNAMICALLY DETERMINE A PROTOCOL FOR COLLECTING SYSTEM STATE INFORMATION FROM ENTERPRISE DEVICES

(71) Applicant: EMC IP Holding Company LLC, Hopkinton, MA (US)

(72) Inventors: Parminder Singh Sethi, Ludhiana (IN); Durai S. Singh, Chennai (IN); Lakshmi Saroja Nalam, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 494 days.

(21) Appl. No.: 16/867,644

(22) Filed: May 6, 2020

(65) Prior Publication Data
US 2021/0350250 A1  Nov. 11, 2021

(51) Int. Cl.
*G06F 16/2455* (2019.01)
*G06N 5/01* (2023.01)
*G06N 20/00* (2019.01)

(52) U.S. Cl.
CPC ......... *G06N 5/01* (2023.01); *G06F 16/24565* (2019.01); *G06N 20/00* (2019.01)

(58) Field of Classification Search
CPC .................................................. G06N 5/003
See application file for complete search history.

(56) References Cited

U.S. PATENT DOCUMENTS 7,865,888 B1 *  1/2011  Qureshi ................. G06N 5/048
                                                       717/170
2019/0179300 A1 *  6/2019  Cella .................. G06F 18/2178

OTHER PUBLICATIONS

Avik Dutta, "Python | Binning Method for Data Smoothing," GeeksforGeeks, https://www.geeksforgeeks.org/python-binning-method-for-data-smoothing/, retrieved, Apr. 27, 2020, 4 pages.
A. Segatori et al., "On Distributed Fuzzy Decision Trees for Big Data," IEEE Transactions on Fuzzy Systems, Abstract, vol. 26, No. 1, Feb. 2018, 3 pages.
G. H. Shah-Hamzei et al., "On-line Learning of Fuzzy Decision Trees for Global Path Planning," Engineering Applications of Artificial Intelligence, Abstract, vol. 12, No. 1, Feb. 1999, 3 pages.

* cited by examiner

*Primary Examiner* — Van H Oberly
(74) *Attorney, Agent, or Firm* — Ryan, Mason & Lewis, LLP

(57) ABSTRACT

A method includes receiving data collected from a plurality of managed devices in a plurality of data collections. The data collections are performed using a plurality of collection protocols. A trigger that generated each of given ones of the data collections is determined. The method further includes identifying a collection protocol of the plurality of collection protocols used for each of the given ones of the data collections, and determining one or more attributes of a plurality of attributes of the plurality of managed devices that have been collected using given ones of the collection protocols. A mapping is generated between the triggers, the collection protocols and the attributes using one or more machine learning algorithms. The generated mapping is used to predict one or more collection protocols of the plurality of collection protocols to use to collect data from one or more of the managed devices.

20 Claims, 9 Drawing Sheets

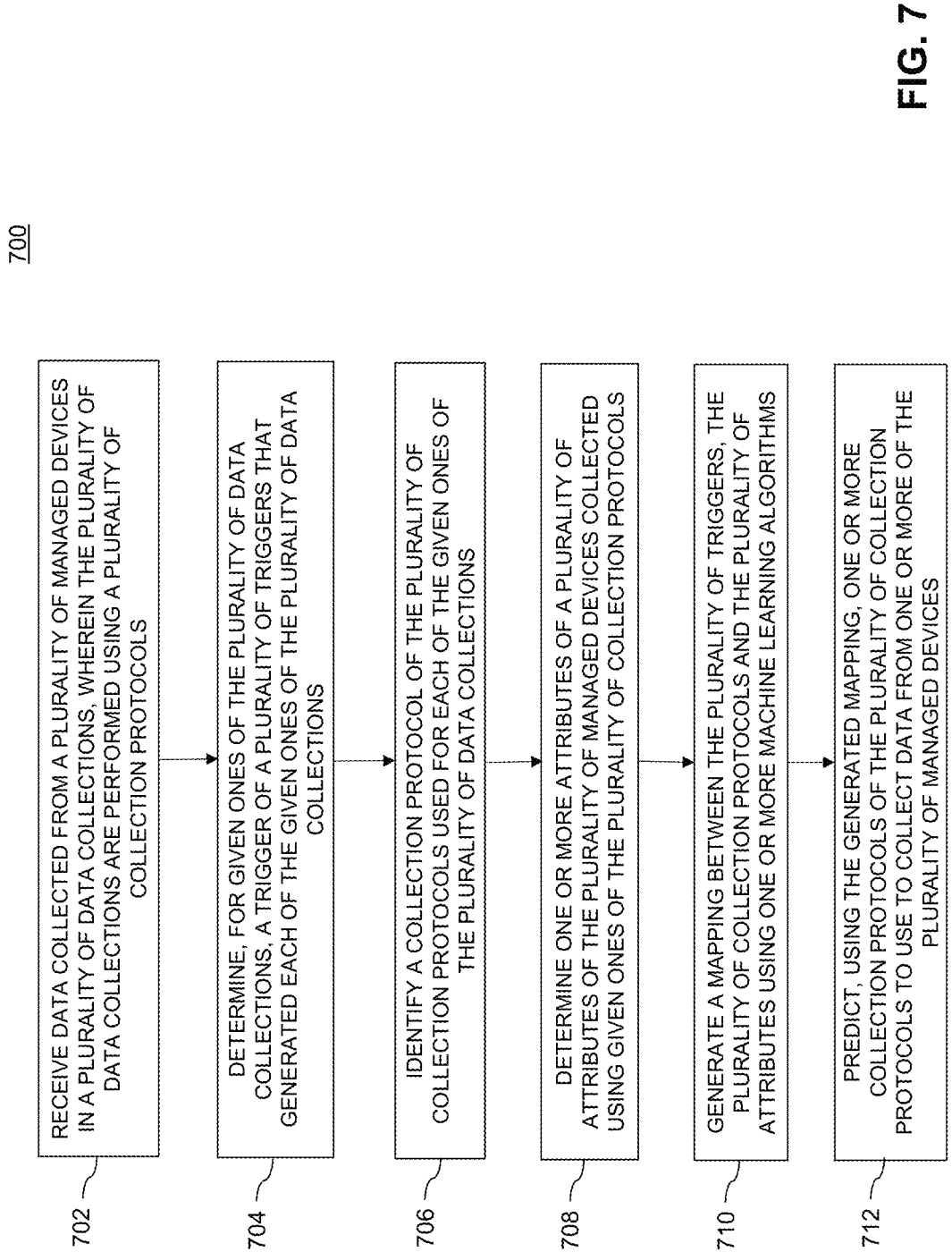

USING MACHINE LEARNING TO DYNAMICALLY DETERMINE A PROTOCOL FOR COLLECTING SYSTEM STATE INFORMATION FROM ENTERPRISE DEVICES

FIELD

The field relates generally to information processing systems, and more particularly to state information collection associated with devices in information processing systems.

BACKGROUND

Information processing systems such as, for example, data centers, typically include multiple servers (e.g., host devices) which are configured to execute workloads associated with one or more software application programs (applications) to access data from and write data to multiple storage arrays. The reading and writing of the data is performed over one or more communications networks using network devices, such as, for example, switches and routers. A data center may typically be managed by some entity, e.g., an enterprise, and one or more information technology (IT) administrators. In such enterprise environments, monitoring and managing server, storage, and networking devices is vital to maximize IT productivity. An IT administrator's task of managing devices is simplified through the use of device management and monitoring applications. These applications collect system state (status) information from managed devices at regular (periodic) intervals. The collected system state information includes the attributes of various components of the devices of an information processing system. For example, the collection from a server may include attributes of components such as the processor, fan, memory, hard-drive, operating system, etc. However, managing this vast amount of state information is a significant challenge for administrators.

SUMMARY

Illustrative embodiments provide techniques for state information collection for devices in an information processing system using one or more machine learning/artificial intelligence (ML/AI) algorithms.

For example, in an illustrative embodiment, a methodology automates selection of a protocol to collect state data for one or more devices based on one or more of historical system state information collections, detected device alerts and/or warnings, collected device errors and/or logs, and technical support tickets. In one or more embodiments, a methodology uses a fuzzy decision tree to create a protocol-attributes dependency map/tree based on the type of system state collection (e.g., alert, periodic or manual) that has been triggered. According to an embodiment, based on weights of nodes on the fuzzy decision tree, the methodology ranks protocols that can be used to address alert-based or other types of system state collections.

Advantageously, illustrative embodiments provide protocols that collect the attributes that are needed to determine a root cause of customer issues or to minimize the attributes that are not able to be collected. In some cases, the methodology provides a fall back protocol to collect data that a primary protocol was not able to collect.

In one embodiment, a method comprises receiving data collected from a plurality of managed devices in a plurality of data collections. The data collections are performed using a plurality of collection protocols. A trigger that generated each of given ones of the data collections is determined. The method further includes identifying a collection protocol of the plurality of collection protocols used for each of the given ones of the data collections, and determining one or more attributes of a plurality of attributes that have been collected using given ones of the collection protocols, wherein the plurality of attributes are of the plurality of managed devices. A mapping is generated between the triggers, the collection protocols and the attributes using one or more machine learning algorithms. The generated mapping is used to predict one or more collection protocols of the plurality of collection protocols to use to collect data from one or more of the managed devices.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 7 is a flow diagram of an exemplary process for determining a protocol for the collection of system state information in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

Figure 1:
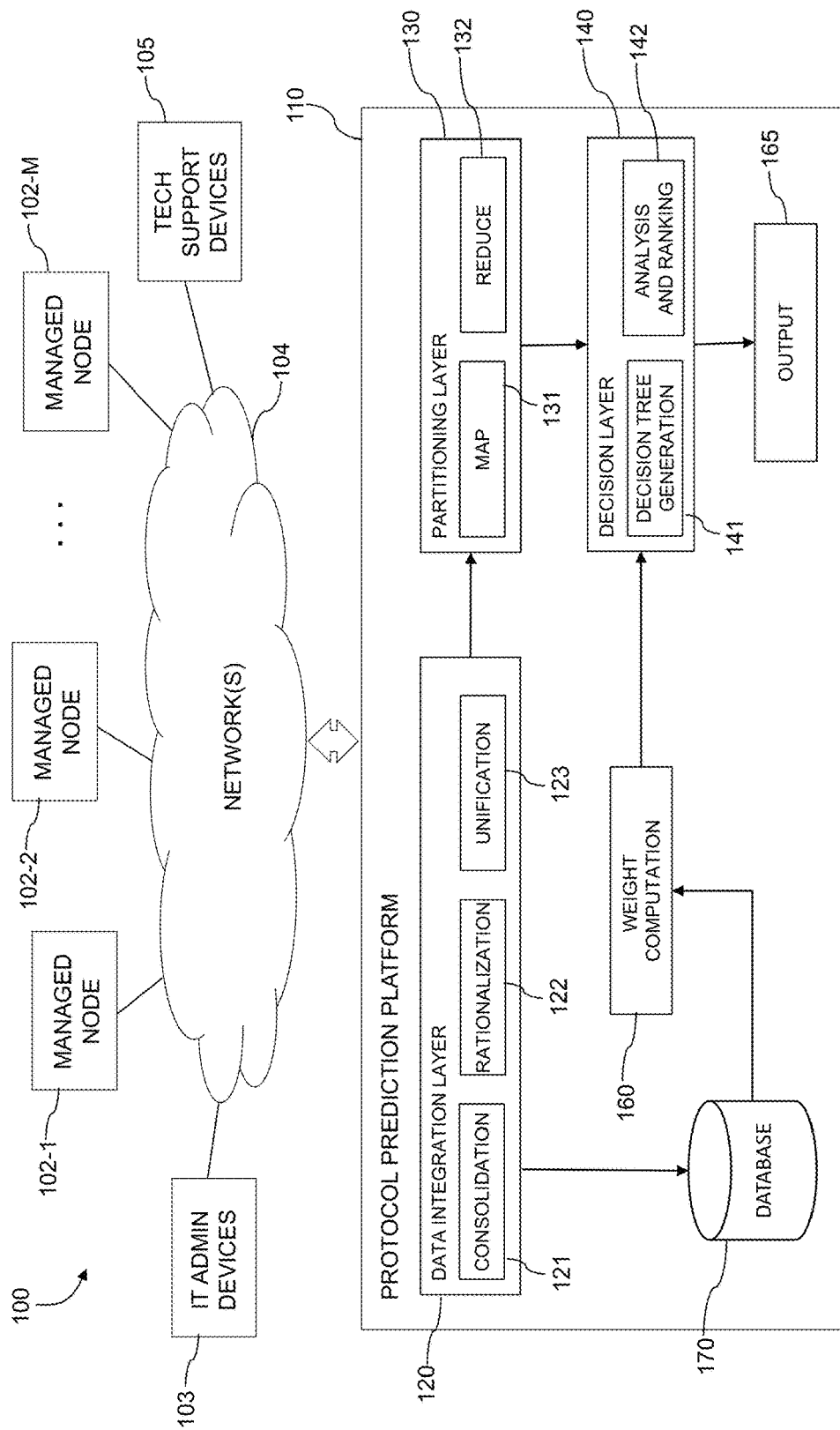
FIG. 1 is a block diagram of an information processing system comprising a protocol prediction platform configured for determining a protocol for the collection of system state information in an illustrative embodiment.

FIG. 1 shows an information processing system 100 configured in accordance with an illustrative embodiment. The information processing system 100 comprises managed nodes 102-1, 102-2, . . . 102-M (collectively "managed nodes 102"), IT administrative devices 103 and technical support devices 105. The managed nodes 102, IT administrative devices 103 and technical support devices 105 communicate over a network 104 with a protocol prediction platform 110.

The managed nodes 102 each comprise, for example, server, storage and networking devices of the information processing system 100 that are managed by one or more IT administrators via one or more IT administrative devices 103. The servers may include, but are not necessarily limited to, host devices configured to execute workloads associated with one or more software application programs to access data from and write data to the storage devices. The storage devices of the managed nodes 102 include, for example, multiple storage arrays. The networking devices of the managed nodes 102 include, but are not necessarily limited to, switches and routers. The devices of the managed nodes 102 can include components, such as, for example, processors, disks, drives, fans, enclosures, memories, logical storage devices (e.g., logical units (LUNs)), ports, kernels and operating systems.

The IT administrative devices 103 and technical support devices 105 can comprise, for example, Internet of Things (IoT) devices, desktop, laptop or tablet computers, mobile telephones, or other types of processing devices capable of communicating with the protocol prediction platform 110 over the network 104. The IT administrative devices 103, the technical support devices 105 and one or more devices of the managed nodes 102 are examples of what are more generally referred to herein as "processing devices." Some of these processing devices are also generally referred to herein as "computers." The IT administrative devices 103, the technical support devices 105 and one or more devices of the managed nodes 102 may also or alternately comprise virtualized computing resources, such as virtual machines (VMs), containers, etc. The IT administrative devices 103, the technical support devices 105 and one or more devices of the managed nodes 102 in some embodiments comprise respective computers associated with a particular company, organization or other enterprise. The variable M and other similar index variables herein such as K, L and N are assumed to be arbitrary positive integers greater than or equal to two.

The term "administrator," "client" or "user" herein is intended to be broadly construed so as to encompass numerous arrangements of human, hardware, software or firmware entities, as well as combinations of such entities. Protocol prediction services may be provided for administrators utilizing one or more machine learning models, although it is to be appreciated that other types of infrastructure arrangements could be used. At least a portion of the available services and functionalities provided by the protocol prediction platform 110 in some embodiments may be provided under Function-as-a-Service ("FaaS") and/or Platform-as-a-Service ("PaaS") models, including cloud-based FaaS and PaaS environments.

Although not explicitly shown in FIG. 1, one or more input-output devices such as keyboards, displays or other types of input-output devices may be used to support one or more user interfaces to the protocol prediction platform 110, as well as to support communication between the protocol prediction platform 110 and connected devices (e.g., IT administrative devices 103, the technical support devices 105 and/or one or more devices of the managed nodes 102) and/or other related systems and devices not explicitly shown.

In some embodiments, the IT administrative devices 103 and the technical support devices 105 are assumed to be associated with repair technicians, system administrators, IT managers, software developers or other authorized personnel configured to access and utilize the protocol prediction platform 110.

The protocol prediction platform 110 in the present embodiment is assumed to be accessible to the IT administrative devices 103, the technical support devices 105 and the managed nodes 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The protocol prediction platform 110, on behalf of respective infrastructure tenants each corresponding to one or more users associated with respective ones of the IT administrative devices 103, utilizes AWL, including decision trees, to predict the most useful protocols for retrieving system data from the managed nodes 102 to use in root cause analysis to solve system problems and/or manage components of the information processing system 100.

Collection of system state information from the devices of the managed nodes 102 may be supported via different protocols. For example, on a server running VMware® ESX® (Elastic Sky X) or EXSi virtualization platforms, system state information can be collected via, for example, Simple Network Management Protocol (SNMP), Representational State Transfer (REST) protocol, Secure Shell (SSH) protocol and/or VMware® port 443 protocol. The number of attributes and/or the components of a device from which attributes are collected vary depending on the protocol used for collecting the system information from the device. For example, on a server running the ESX® virtualization platform, attributes of a fan, enclosure, and hard-drive are collected only via SSH protocol, whereas attributes of other components such as, for example, the processor, memory and operating system are collected only via the VMware® port 443 protocol.

Device management applications running on, for example, IT administrative devices 103, trigger a data collection of system state information from a managed device of a managed node 102 when a critical alert is detected on that managed device. The alert-based and historical (e.g., periodic) data collections are used by, for example, IT administrators (e.g., of an IT helpdesk) to troubleshoot and resolve problems that occur on the devices. Current methods of data collection are designed to initiate the collection of system information simultaneously via multiple collection protocols, and as soon as the system state information is successfully collected via one of the protocols, collection of system state information via all other protocols is halted. As a result of the ceasing of the collection of system state information via the other collection protocols, the collected system state information lacks device attributes which are able to be collected by the halted collection protocols and not able to be collected by the protocol corresponding to the successful collection. Therefore, when using conventional methods, the collected device attributes may not include device attributes that are important and/or necessary for the IT administrators to resolve problems occurring on the managed devices. As a result, the IT administrators may have to initiate another collection of system state information via another protocol in order to obtain the information needed to perform a root cause analysis of the system issues. This causes unwanted delays and wasted computer resources when IT administrators are attempting to troubleshoot a problem.

As an advantage over conventional methods, the embodiments provide a dynamic AI/ML based method to automatically determine the protocol by which the most relevant system state information (e.g., component attributes) can be collected from a managed device when a critical alert is detected. The embodiments ensure that device attributes necessary for IT administrators to troubleshoot an issue are readily available.

Referring to FIG. 1, the protocol prediction platform 110 comprises a data integration layer 120, a partitioning layer 130, a decision layer 140, a weight computation layer 160, an output layer 165 and one or more databases 170. The data integration layer 120 includes consolidation, rationalization and unification components 121, 122 and 123. The partitioning layer 130 includes map and reduce components 131 and 132, and the decision layer 140 includes a decision tree generation component 141 and an analysis and ranking component 142.

Figure 2:
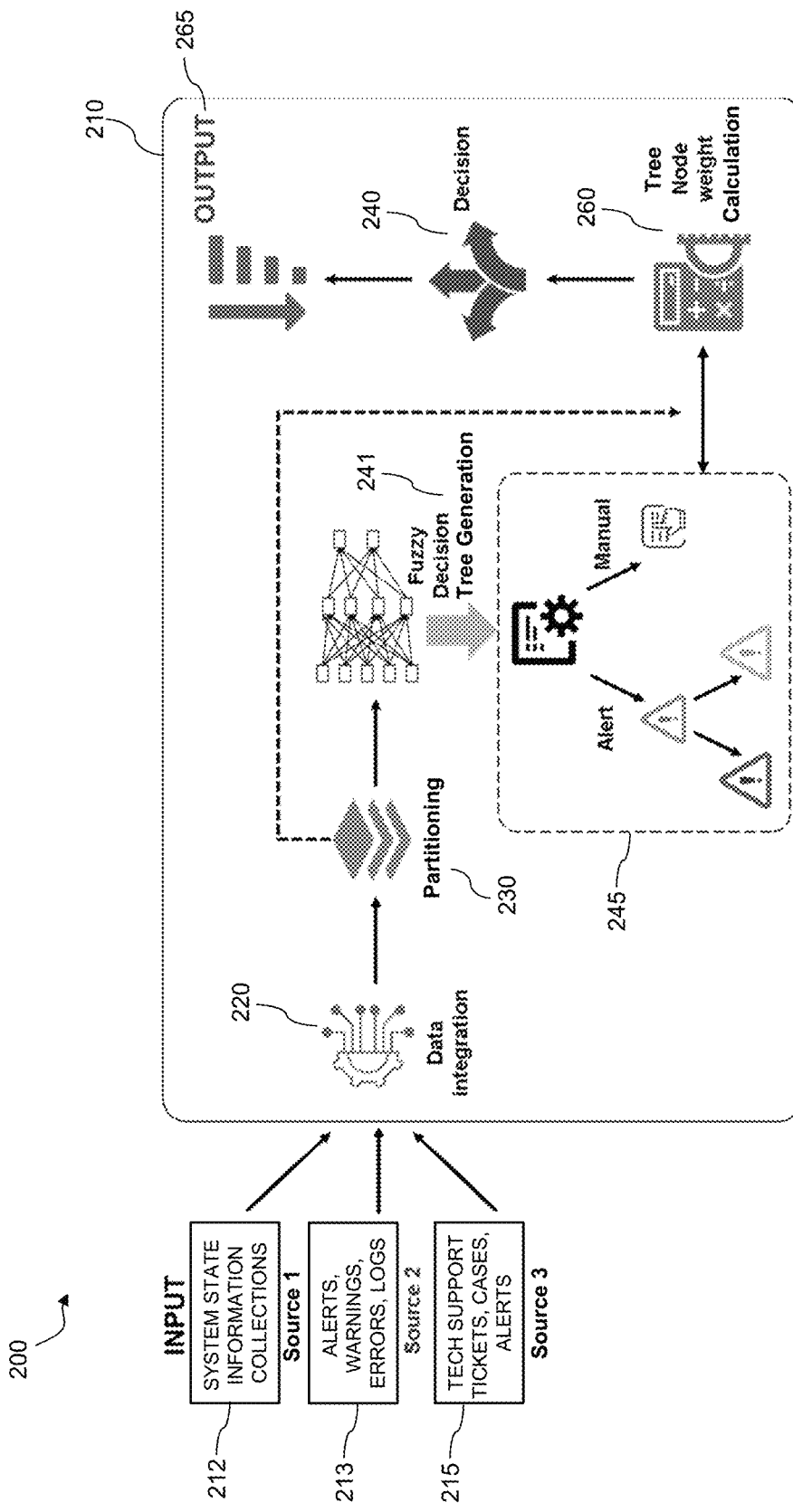
FIG. 2 is an operational block diagram depicting a process for determining a protocol for the collection of system state information in an illustrative embodiment.
Figure 3:
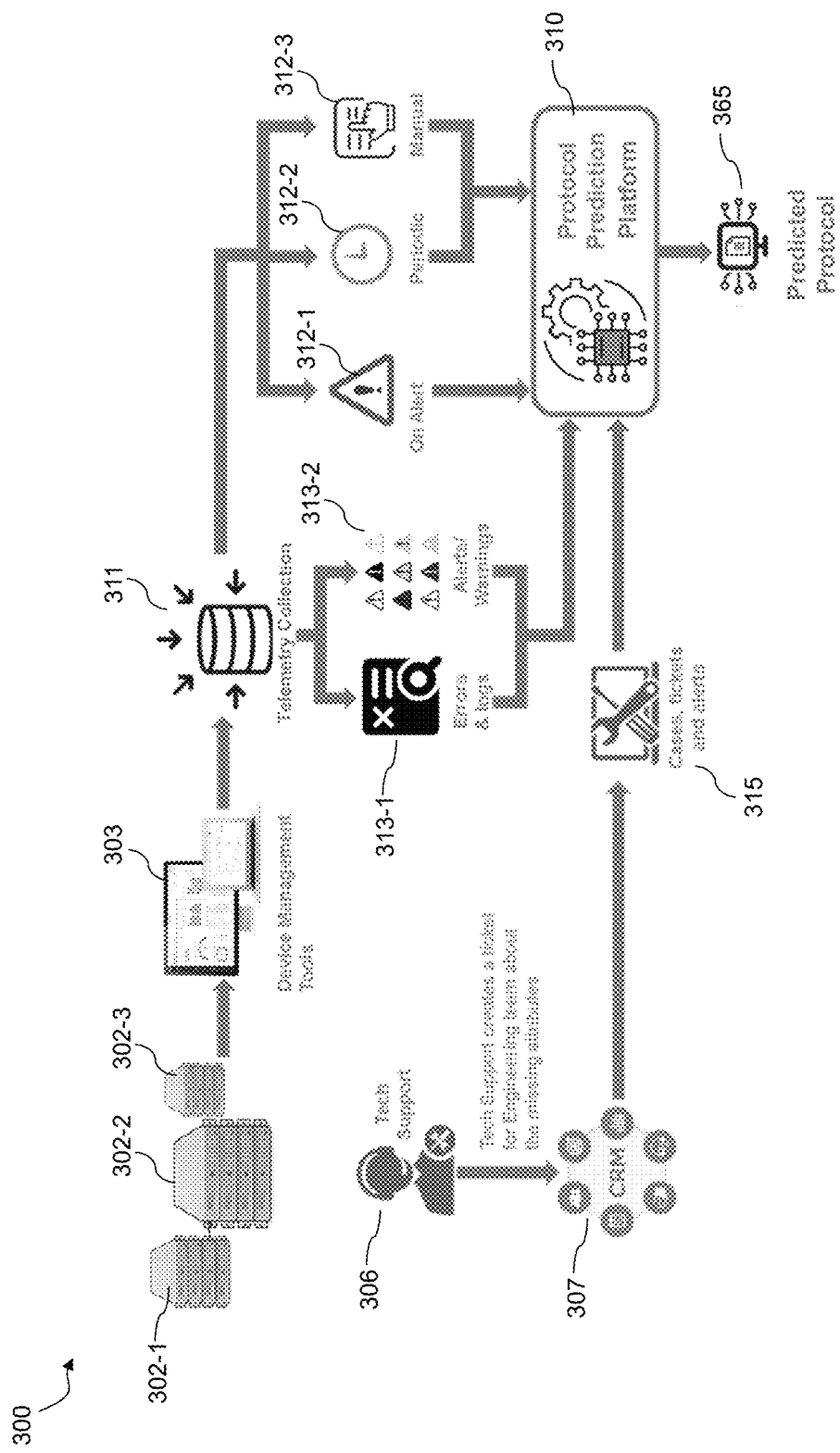
FIG. 3 is a block diagram depicting element interactions in an information processing system comprising a protocol prediction platform configured for determining a protocol for the collection of system state information in an illustrative embodiment.

Referring to FIGS. 1, 2 and 3, the data integration layer 120 of the protocol prediction platform 110 is configured to receive data from at least three types of sources including (i) system state information collections from devices of the managed nodes 102 obtained via collection protocols; (ii) alerts, warnings, errors and/or logs detected on the devices from the managed nodes 102; and (iii) technical support ticket, case and alert data. As shown in FIG. 2 in the information processing system 200, system state information collections 212 are depicted as source 1, alerts, warnings, errors and/or logs 213 are depicted as source 2 and technical support ticket, case and alert data 215 is depicted as source 3. In FIG. 2, the data from sources 1, 2 and 3 is transmitted to the protocol prediction platform 210, where data integration 220 is performed.

Referring to FIG. 3, information processing system 300 comprises managed nodes 302-1, 302-2 and 302-3 (collectively "managed nodes 302") which provide data to IT administrative devices 303 running device management tools for IT administrators to manage the devices of the managed nodes 302 and retrieve data from the managed devices. The data from the managed nodes 302 comprises data from the system state information collections, and alerts, warnings, errors and/or logs detected on the devices from the managed nodes 302. As shown in FIG. 3, the data from the managed nodes 302 is collectively referred to as telemetry collection data 311, and includes on-alert and periodic system state information collections 312-1 and 312-2 that are triggered automatically, and manual system state information collections 312-3 that are manually triggered, such as, for example, user-initiated collections. The on-alert system state collections 312-1 are automatically triggered in response to an alert received from one of the managed nodes 102/302. The alert corresponds to, for example, a detected problem on one or more components of a managed device. The periodic system state collections 312-2 are automatically triggered based on a scheduled data collection, such as for example, a data collection that has been programmed to occur at a specific time daily, weekly, etc. The telemetry collection data 311 also includes the errors and/or logs 313-1 from the devices of the managed nodes 302, and alerts and/or warnings 313-2 detected from the devices of the managed nodes 302. The devices of the managed nodes 302 can be remotely monitored using the IT administrative devices 103/303, and may be devices associated with an enterprise.

In FIG. 3, the technical support ticket, case and alert data 315 originates from technical support personnel 306 using, for example, technical support devices (105 in FIG. 1). In one embodiment, the technical support personnel 306 create tickets, cases and/or alerts when system state collections from a managed device do not contain the attributes that are necessary for troubleshooting a component issue. Such tickets, cases and/or alerts may be generated, for example, when IT administrators or other clients inform technical support personnel 306 of problems with managed nodes and/or a lack of information to fix component issues on the managed nodes. The tickets, cases and/or alerts from the technical support personnel 306 may be from multiple communication channels, such as, for example, website, email, live chat, social media and telephone sources, and may be compiled by a customer relationship management (CRM) engine 307.

As can be seen in FIG. 3, like in FIG. 2, the data from the different sources 312, 313 and 315 is transmitted to the protocol prediction platform 310. In FIG. 1, although the sources 212/312, 213/313 and 215/315 are not specifically shown, it is understood that the data from these sources is from the managed nodes 102, IT administrative devices 103 and/or technical support devices 105, and is communicated via network 104 to protocol prediction platform 110. It is to be understood that the protocol prediction platform 310 in FIG. 3 may have the same or similar configuration and/or architecture as the protocol prediction platform 110 of FIG. 1.

According to an embodiment, the data integration layer 120 receives the data 212/312, 213/313 and 215/315 from the three sources as raw data. The raw data inputs flow into the data integration layer 120, where the raw data is consolidated by the consolidation component 121, rationalized by the rationalization component 122, and unified by the unification component 123 for further analysis in the protocol prediction platform 110 (or 210 and 310).

Following integration by the data integration layer 120, the integrated data is provided to the partitioning layer 130 for data partitioning (see also partitioning 230 in FIG. 2). In the data partitioning layer 130, using the map and reduce components 131 and 132, the unified data is divided into manageable partitions that can be accessed separately. More specifically, referring to FIG. 4, the data partitioning layer 130 uses fuzzy partitioning to generate bin boundaries 491 and/or fuzzy partitions 492 (also referred to herein as "fuzzy sets"). According to an embodiment, the partitioning layer 130 partitions the inputted telemetry collection data (e.g., telemetry collection data 311 from FIG. 3).

Figure 4:
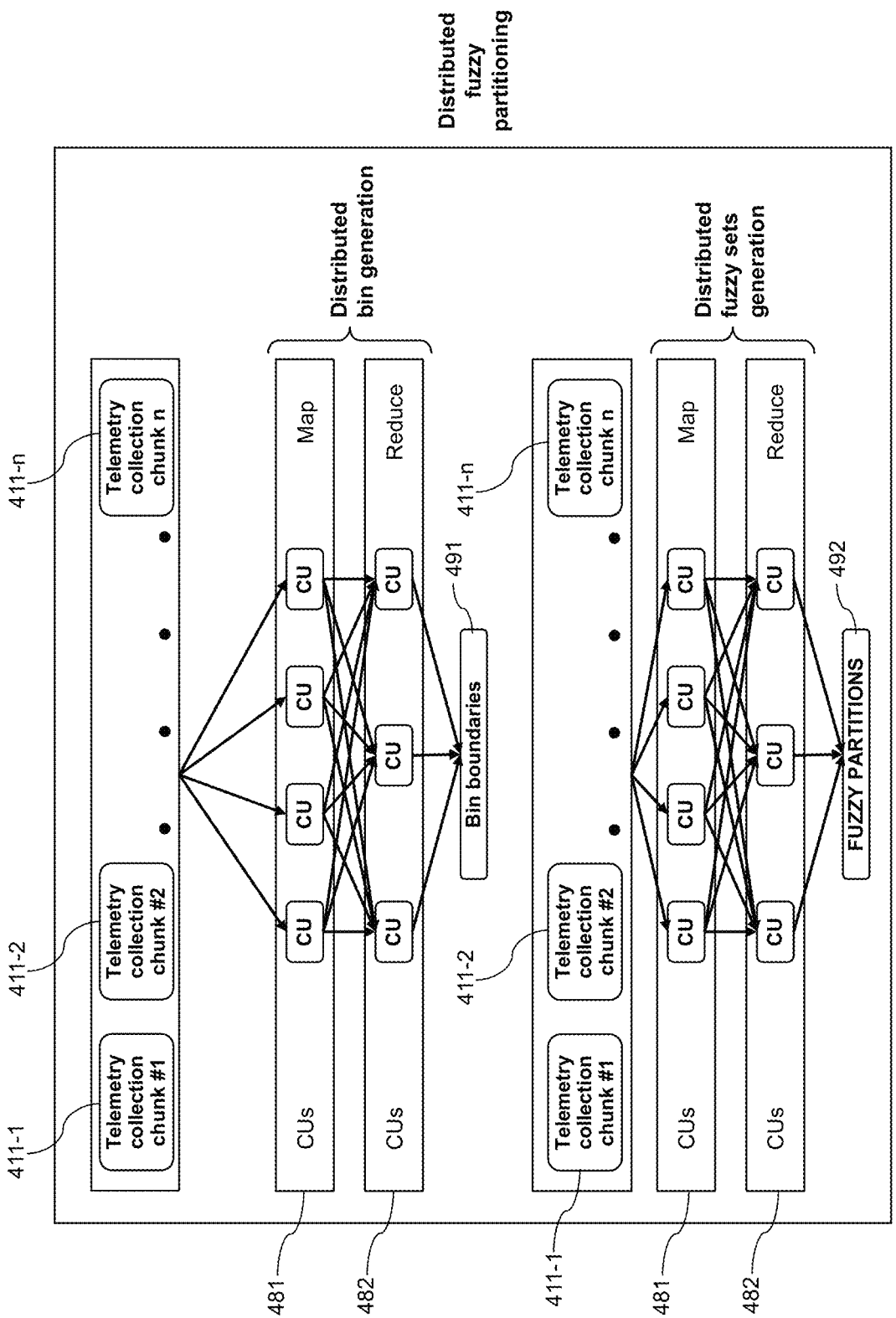
FIG. 4 is a diagram depicting a partition layer architecture of a protocol prediction platform in an illustrative embodiment.

As shown in FIG. 4, the inputted telemetry collection data is divided into a plurality of subsets (also referred to herein as "telemetry collection chunks") 411-1, 411-2, . . . 411-*n* (collectively "telemetry collection chunks 411"). In generating the bin boundaries 491, the partitioning layer 130 uses binning to smooth the telemetry collection data. Using map/reduce techniques, the map component 481 sorts the data from the telemetry collection chunks 411 into smaller groups of key-value pairs, and then using the reduce component 482, shuffles the sorted data and distributes it into a number of buckets or bins. For example, the reduce component 482 distributes data with the same keys into the same bins. In smoothing to generate the bin boundaries 491, minimum and maximum values in a given bin are identified as the bin boundaries, and each bin value is replaced by its closest boundary value. Each of the map and reduce components 481 and 482 include computing units (CUs) accommodating the partitioned data.

In generating the fuzzy partitions (or fuzzy sets) 491, the partitioning layer 130 uses also uses map/reduce techniques. Specifically, the map component 481 sorts the data from the telemetry collection chunks 411 into smaller groups of key-value pairs, and then using the reduce component 482, shuffles the sorted data and distributes it into a number of partitions or sets 492. For example, the reduce component 482 distributes data with the same keys into the same sets. According to one or more embodiments, three categories of techniques can be used for fuzzy partitioning: (i) grid partitioning; (ii) tree partitioning; and (iii) scatter partitioning. In grid partitioning, the input space is divided into several fuzzy slices to form a partition, and each slice is identified by a membership function for each feature.

Referring back to FIG. 1, the partitioned data is input to the decision layer 140, where a decision tree generation component 141 generates a decision tree. For example, referring to FIG. 2, after partitioning 230, fuzzy decision tree (FDT) generation 241 is performed. The decision tree generation component 141 classifies the partitioned data into an FDT by using a distributed FDT machine learning algorithm. This method generates a strong fuzzy partition for each continuous attribute based on fuzzy information entropy. The FDT based machine learning algorithm uses fuzzy information gain for selecting the attributes at the decision nodes of the FDT, which provides an effective solution in the framework of fuzzy classification. A distributed FDT machine learning algorithm generates both binary and multi-path FDTs from relatively large volumes (e.g., hundreds of gigabytes or terabytes) of telemetry data.

Figure 5:
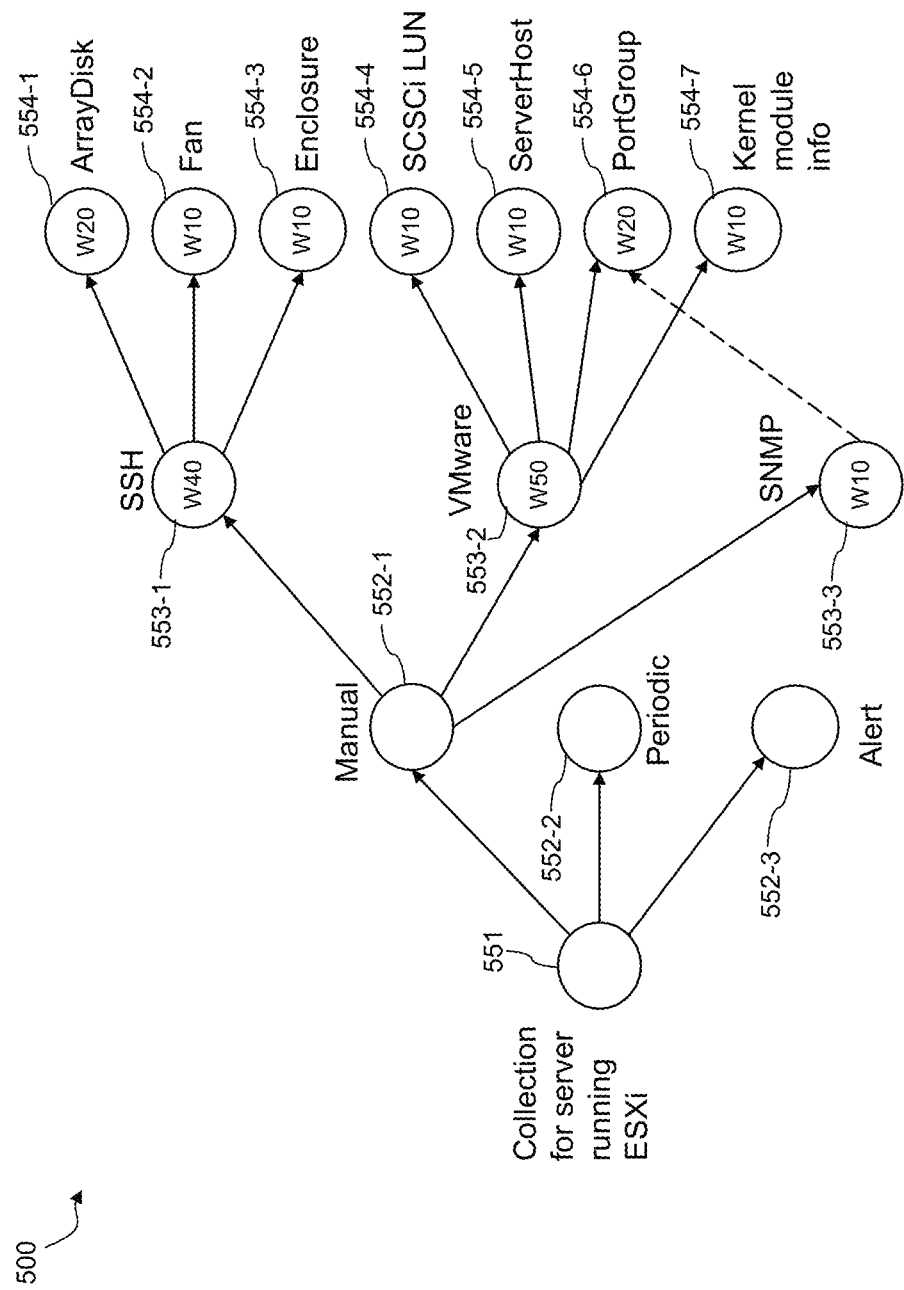
FIG. 5 is a diagram of a fuzzy decision tree generated by a protocol prediction platform in an illustrative embodiment.

Decision trees extracted from the partitions of the partitioning layer 130 and generated by the decision tree generation component 141 include, for example, mappings of different communication protocols, managed device attributes and type of collection (e.g., collection trigger (Alert, Manual or Periodic)). For example, FIG. 5 shows an example FDT 500 in connection with an operational example of system state data collected from a server running an ESXi virtualization platform. The operational example in FIG. 5 is used for purposes of explanation. The embodiments are not limited to the operational example shown in FIG. 5, and may be applied to numerous different managed devices running different platforms and/or operating systems.

The FDT 500 from a base node 551, maps the trigger that generated the collection of the system state data (nodes 552-1, 552-2 and 552-3) (collectively "trigger nodes 552), the protocol via which the data was collected (nodes 553-1, 553-2 and 553-3) (collectively "protocol nodes 553"), and the attributes that have been collected (nodes 554-1, 554-2, 554-3, 554-4, 554-5, 554-6 and 554-7) (collectively "attribute nodes 554"). As explained herein, the trigger that generated the collection (or type of collection) can be a manual trigger 552-1 (e.g., user-initiated), a periodic trigger 552-2 (e.g., scheduled) or an alert trigger 552-3 (e.g., responsive to an alert about a problem with a device component). The protocol nodes in this example include SSH protocol (node 553-1), VMware protocol (node 553-2) and SNMP (node 553-3). The attribute nodes 554-1, 554-2, 554-3, 554-4, 554-5, 554-6 and 554-7 respectively refer to attributes of the following components of the server: ArrayDisk, Fan, Enclosure, SCSCi LUN, ServerHost, PortGroup and Kernel module. Each component may have one or more attributes. In this case, the FDT 500 represents the attributes that are collected from a server running the ESXi virtualization platform by the various supported protocols for a manually triggered collection. In a different example, FIG. 2 shows a decision tree 245 based on an alert-triggered collection.

As can be seen in FIG. 5, the manually triggered collection (node 552-1) uses SSH, VMware and SNMP collection protocols (node 553-1, 553-2 and 553-3). The SSH protocol produces data on attributes of the ArrayDisk, Fan and Enclosure (nodes 554-1, 554-2 and 554-3). The VMware protocol produces data on attributes of the SCSCi LUN, ServerHost, PortGroup and Kernel module (nodes 554-4, 554-5, 554-6 and 554-7). SNMP produces data on attributes of the PortGroup (node 554-6). The VMware protocol produces data on the attributes of 4 components, the SSH protocol produces data on the attributes of 3 components, while SNMP produces data on the attributes of 1 component.

FIG. 5 includes weights associated with the protocol and attribute nodes 553 and 554. As can be seen, the VMware node 553-2 has a weight of W50, which is higher than the weights of the SSH node 553-1 (W40) and the SNMP node 553-3 (W10). The attribute nodes 554-1 and 554-6 corresponding to the ArrayDisk and the PortGroup each have a higher weight (W20) than that of the remaining attribute nodes 554-2, 554-3, 554-4, 554-5 and 554-7, which each have a weight of W10. The node weights are assigned automatically based on the qualitative and quantitative criteria of historically collected attributes.

According to an embodiment, the weight computation layer 160 uses one or more machine learning techniques (e.g., linear regression, neural network, Support Vector Machine (SVM), Multilayer Perceptron (MLP), a deep learning model and/or clustering) to assign the tree node weights based on historically collected attributes retrieved from database 170. For example, the weight computation layer 160 analyzes previous system state collections and their collection protocols to determine which collection protocols collected which attributes. The weight computation layer 160 also analyzes previously detected alerts, warnings, errors and logs, as well as technical support tickets to determine the effectiveness of different collection protocols in connection with the collection of different attributes. For example, the weight computation layer 160 will give weights to the nodes based on tickets that have been generated for missing attributes and the protocol that was used for the collection. As can be seen in FIG. 2, tree node weight calculation 260 may use partitioned data to determine tree node weights based on the generated ticket data 215 generated for missing attributes and the corresponding protocol that was used for the collection in that case. Referring further to FIGS. 1 and 2, the calculated tree node weights are incorporated into a generated decision tree by the decision tree generation component 141.

According to an embodiment, the node weight is driven by the urgency of the collection context. For example, a manual collection using a given protocol will have a lower weight than an alert-based collection using the same given protocol. Alternatively, or in addition, the node weight is driven by the number of attributes able to be collected by a given protocol, wherein a protocol that is capable of collecting a higher number of attributes is weighted higher than a protocol capable of collecting a lower number of attributes. For example, in FIG. 5, the VMware protocol collects the highest number of attributes, and is weighted the highest among the three protocols, while SNMP, which collects the least number of attributes is weighted the lowest.

According to the embodiments, different decision trees are generated by the decision tree generation component 141 based on type of collection being used, the managed device from which the system state data is being collected, and/or the attributes being sought. For example, the decision tree will correspond to the particular component and the particular managed device that may be the subject of an alert detailing problems with that particular component. Also, decision trees may differ based on the type of collection.

Figure 6A:
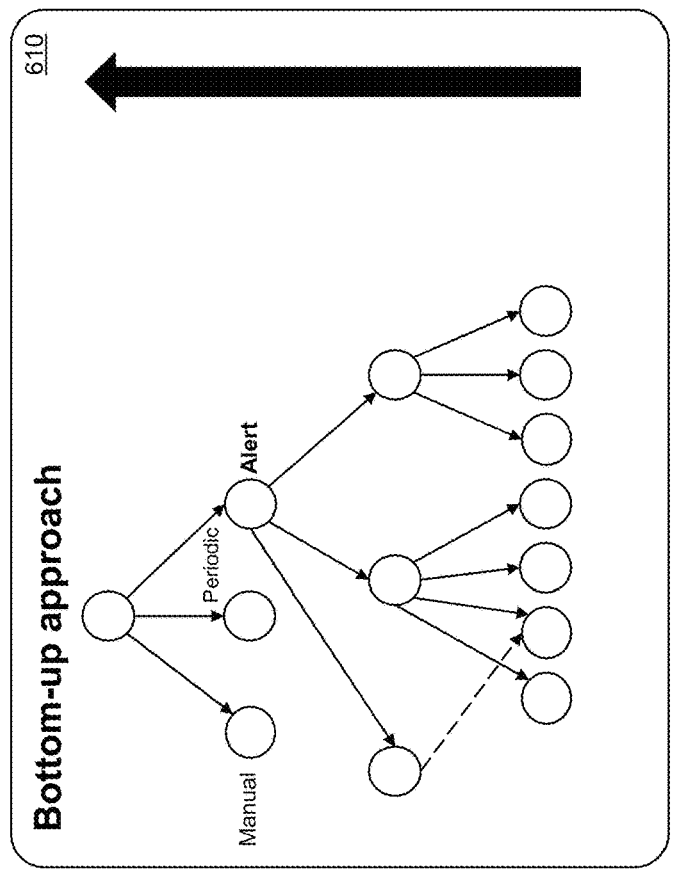
FIG. 6A depicts a top-down prediction approach for a fuzzy decision tree in an illustrative embodiment.
Figure 6B:
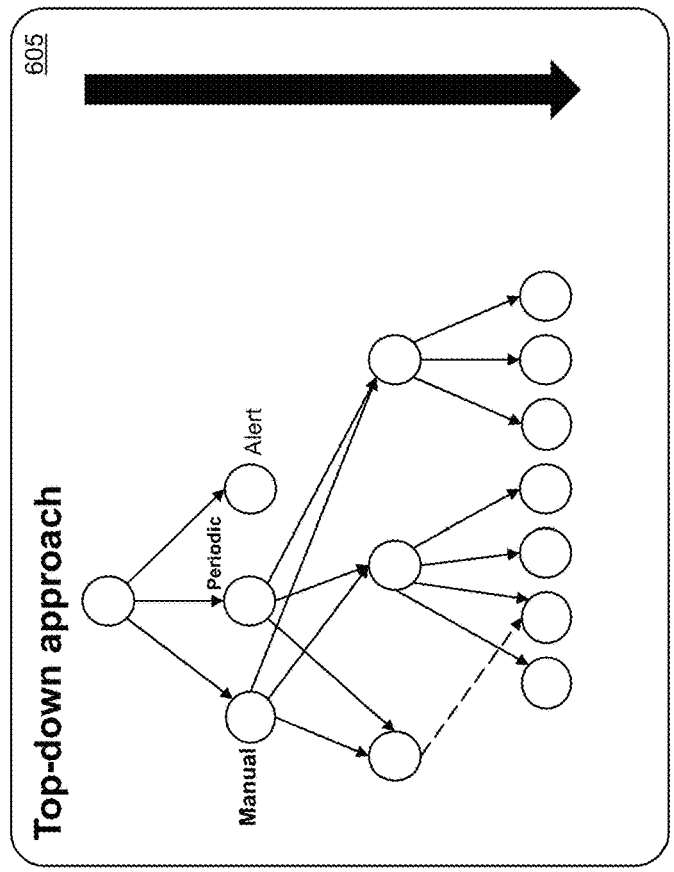
FIG. 6B depicts a bottom-up prediction approach for a fuzzy decision tree in an illustrative embodiment.

In addition, referring to FIGS. 1 and 6A-6B, the decision layer 140 includes an analysis and ranking component 142, which determines how to use a generated decision tree to make a protocol prediction for a given situation. For example, referring to FIG. 6A, in the case where a manual collection of a given managed device or plurality of devices is initiated by a user, or a scheduled periodic collection is to be executed, a top-down traversal 605 of the decision tree will be used to predict the protocol that retrieves the most attributes. In these scenarios, following the highest node weight from the top to the bottom of the decision tree will provide the protocol that retrieves the most attributes. Alternatively, referring to FIG. 6B, in the case where a collection of a given managed device or plurality of devices is based on an alert about a problem with a particular component of a given managed device, a bottom-up traversal 610 of the decision tree will be used to predict the protocol that retrieves the attributes related to the particular component of interest. For example, starting with the particular component of interest at the bottom of the decision tree leads to the most relevant protocol for collection of system state data about that component and its attributes. In this case, the most relevant protocol may not necessarily be the protocol that retrieves the most attributes, but instead retrieves the attributes of the component which was the subject of the alert. In other words, in the bottom-up approach, the most appropriate protocol is determined by assessing the relevant attributes that are collected by a specific protocol. For example, assuming there is an alert about a problem with a fan in a given managed node, and fan attributes can be collected by SSH and VMware protocols. In this case, even if the VMware protocol collects more attributes given all components (i.e., not just fans), SSH protocol will be weighted higher in this particular situation because it collects more attributes related to the fan.

The analysis and ranking component 142 of the decision layer 140 also generates a ranking of the protocols based on relevance to a given situation. Ranking of protocols is beneficial as the system 100 can fall back on secondary (e.g., lower ranked) protocols if the collection of needed state system information is not possible through a primary (e.g., higher ranked) protocol. According to an embodiment, in alert-based collections, the protocols are ranked using weights of decision tree nodes based on their ability to retrieve attributes relating to a subject component of an alert. For manual and periodic collections, the protocols are ranked using the weights of the decision tree based on which protocols provide the most attributes. Ranking ensures collection of information about those attributes needed to root cause customer issues and/or minimize the loss of attributes in cases where data collection needs to be performed via one or more fall back protocols. In the flow of FIG. 2, the decision 240 includes the predicted protocol, and may include a ranking as described herein.

The protocol prediction platform 110 includes an output layer 165, which may comprise a data visualization component. The output layer 165 receives from the decision layer 140, the predicted protocol and, in some cases, the predicted protocol as a primary collection protocol ranked with one or more secondary protocols. The output layer 165 provides the predicted protocol or the predicted protocol along with one or more secondary protocols to a user, such as an IT administrator via the network 104 and an IT administrative device 103. In this case, the user can choose to implement a system state collection on a managed node 102 using the predicted protocol and one or more back-up protocols if provided. Alternatively, the predicted protocol or the predicted protocol along with one or more secondary protocols is automatically implemented in a system state collection targeting a managed node 102. The data visualization component provides the predicted protocol or the predicted protocol along with one or more secondary protocols for viewing by a user on a user interface of a user device, such as, for example, an IT administrative device 103. For example, the data visualization component organizes the protocols in an appropriate form for viewing and selection and commencement of a data collection by a user on an application with an active interface (e.g., graphical user interface (GUI)) on the user device. The output of the predicted protocol or the predicted protocol along with one or more secondary protocols is further depicted for systems 200 and 300 as elements 265 and 365 in FIGS. 2 and 3.

The database 170 in some embodiments is implemented using one or more storage systems or devices associated with the protocol prediction platform 110. In some embodiments, one or more of the storage systems utilized to implement the database 170 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

At least portions of the protocol prediction platform 110 and the components thereof may be implemented at least in part in the form of software that is stored in memory and executed by a processor. The protocol prediction platform 110 and the components thereof comprise further hardware and software required for running the protocol prediction platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data integration layer 120, partitioning layer 130, decision layer 140, weight computation layer 160, output layer 165, database 170 and other components of the protocol prediction platform 110 in the present embodiment are shown as part of the protocol prediction platform 110, at least a portion of the data integration layer 120, partitioning layer 130, decision layer 140, weight computation layer 160, output layer 165, database 170 and other components of the protocol prediction platform 110 in other embodiments may be implemented on one or more other processing platforms that are accessible to the protocol prediction platform 110 over one or more networks. Such components can each be implemented at least in part within another system element or at least in part utilizing one or more stand-alone components coupled to the network 104.

It is assumed that the protocol prediction platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data integration layer 120, partitioning layer 130, decision layer 140, weight computation layer 160, output layer 165, database 170 and other components of the protocol prediction platform 110, and the elements thereof can each be implemented in the form of one or more LXCs running on one or more VMs. Other arrangements of one or more processing devices of a processing platform can be used to implement the data integration layer 120, partitioning layer 130, decision layer 140, weight computation layer 160, output layer 165 and database 170, as well as other components of the protocol prediction platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the protocol prediction platform 110 to reside in different data centers. Numerous other distributed implementations of the protocol prediction platform 110 are possible.

Accordingly, one or each of the data integration layer 120, partitioning layer 130, decision layer 140, weight computation layer 160, output layer 165, database 170 and other components of the protocol prediction platform 110 can each be implemented in a distributed manner so as to comprise a plurality of distributed components implemented on respective ones of a plurality of compute nodes of the protocol prediction platform 110.

It is to be appreciated that these and other features of illustrative embodiments are presented by way of example only, and should not be construed as limiting in any way.

Accordingly, different numbers, types and arrangements of system components such as the data integration layer 120, partitioning layer 130, decision layer 140, weight computation layer 160, output layer, database 170 and other components of the protocol prediction platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the protocol prediction platform 110 can be offered to cloud infrastructure customers or other users as part of FaaS and/or PaaS offerings.

The operation of the information processing system 100, 200 and/or 300 will now be described in further detail with reference to the flow diagram of FIG. 7. With reference to FIG. 7, a process 700 for determining a protocol for the collection of system state information as shown includes steps 702 through 712, and is suitable for use in the system 100, 200 and/or 300 but is more generally applicable to other types of information processing systems comprising a protocol prediction platform configured for determining a protocol for the collection of system state information.

In step 702, data collected from a plurality of managed devices in a plurality of data collections is received. The plurality of data collections are performed using a plurality of collection protocols comprising, for example, SNMP, REST protocol, SSH protocol and/or port 443 protocol. The data collected from the plurality of managed devices comprises system state information.

In step 704, for given ones of the plurality of data collections, a trigger of a plurality of triggers that generated each of the given ones of the plurality of data collections is determined. The triggers comprise, for example, a periodic collection, an alert-based collection and/or a user-initiated collection.

In step 706, a collection protocol of the plurality of collection protocols used for each of the given ones of the plurality of data collections is identified, and in step 708, one or more attributes of a plurality of attributes that have been collected using given ones of the plurality of collection protocols are determined. The one or more attributes correspond to a plurality of components of the plurality of managed devices.

In step 710, a mapping between the plurality of triggers, the plurality of collection protocols and the plurality of attributes is generated using one or more machine learning algorithms. In an embodiment, the mapping comprises an FDT. In step 712, the generated mapping is used to predict one or more collection protocols of the plurality of collection protocols to use to collect data from one or more of the plurality of managed devices.

According to one or more embodiments, the process further includes determining a plurality of weights of given nodes of the decision tree, wherein the weights of the given nodes of the decision tree are based on a type of one or more of the plurality of triggers and/or a number of the plurality of attributes collected by given ones of the plurality of collection protocols. The process may also include ranking the predicted one or more collection protocols based on the weights of the given nodes.

Map/reduce techniques can be used to partition the received data collected from a plurality of managed devices into a plurality of fuzzy sets. The partitioned data can them be used to generate one or more FDTs.

According to one or more embodiments, an alert and/or a warning detected on the one or more of the plurality of managed devices is detected, and one or more of the plurality of attributes corresponding to the alert and/or the warning is identified. The prediction of the one or more collection protocols to use to collect the data from the one or more of the plurality of managed devices is based on the identified one or more of the plurality of attributes corresponding to the alert and/or the warning. The process may further include ranking the predicted one or more collection protocols based on a number of the identified one or more of the plurality of attributes able to be retrieved from the one or more of the plurality of managed devices using a given collection protocol of the predicted one or more collection protocols.

The process may further include receiving error data and/or activity log data collected from the one or more of the plurality of managed devices, and applying the error data and/or the activity log data to the one or more machine learning algorithms to generate the mapping. In addition, one or more technical support tickets corresponding to the one or more of the plurality of managed devices may be received, and the one or more technical support tickets can be applied to the one or more machine learning algorithms to generate the mapping.

It is to be appreciated that the FIG. 7 process and other features and functionality described above can be adapted for use with other types of information systems configured to execute protocol prediction services on a protocol prediction platform or other type of processing platform.

The particular processing operations and other system functionality described in conjunction with the flow diagram of FIG. 7 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with the protocol prediction platform as disclosed herein can provide a number of significant advantages relative to conventional arrangements. For example, one or more embodiments are configured to provide a predictive learning and decision-based mechanism to predict the most appropriate protocol to collect system information from managed enterprise devices, as well as recommend the most preferred fall back collection protocol if needed.

Advantageously, the embodiments use distributed fuzzy decision trees created via an inductive learning methodology that automatically classifies objects based on their attribute values. The decision tree structure provides a mechanism to intelligently define decision rules.

Current methods of data collection commence collection of system information simultaneously via multiple collection protocols. However, once system state information is successfully collected via one of the protocols, collection of system state information via remaining protocols ceases. When this occurs, device attributes which are only able to be collected by the halted collection protocols are not collected. As a result, when using conventional methods, the collected device attributes may not include device attributes that are important and/or necessary for the IT administrators to resolve problems occurring on the managed devices. As a result, computer resources and time are wasted by IT administrators having to manually initiate multiple collections of system state information via other protocols in order to obtain the information needed to perform a root cause analysis of the system issues. This causes unwanted delays and wasted computer resources when IT administrators are attempting to troubleshoot a problem.

Advantageously, the embodiments use historical data from different device types (e.g., servers, switches, etc.). The historical data includes collected system information, activity logs, error reports and technical support tickets generated while root causing customer issues, and is used to construct machine learning classifiers for predicting collection protocols for devices based on their attribute values. The technical support tickets are the result of not being able to find data on specific device attributes when certain collection protocols were used, and are co-related with telemetry information and logs, which help identify which attribute data is being collected by specific protocols.

Unlike former approaches, the illustrative embodiments provide a comprehensive solution utilizing AI/ML to automate the selection of a protocol to collect telemetry data based on historical collections, alerts, tickets and errors. The embodiments advantageously use FDTs to create a protocol-attributes dependency map in real-time based on the type of collection (e.g., alert-based, manual or periodic) triggered. As another advantage, the embodiments rank the protocols using weights of the nodes on the decision tree generated by the AI/ML methodology. The embodiments implement the automatic prediction of collection protocols that will result in complete collections of whatever attributes are needed to determine a root cause customer issues or, at the very least, provide for collection protocols that collect the most attributes to resolve problems with managed devices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the protocol prediction platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a protocol prediction platform in illustrative embodiments. These and other cloud-based systems in illustrative embodiments can include object stores.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
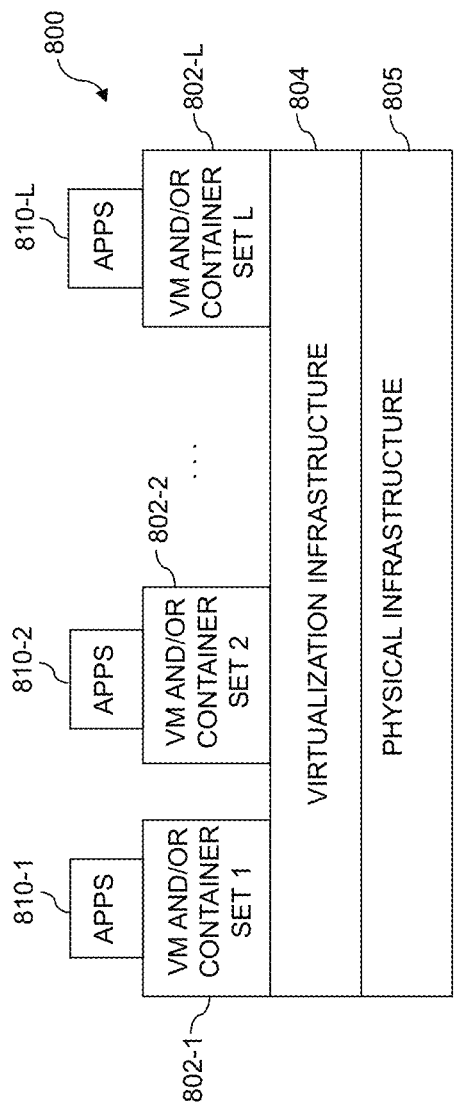
FIGS. 8 and 9 show examples of processing platforms that may be utilized to implement at least a portion of an information processing system in illustrative embodiments.
Figure 9:
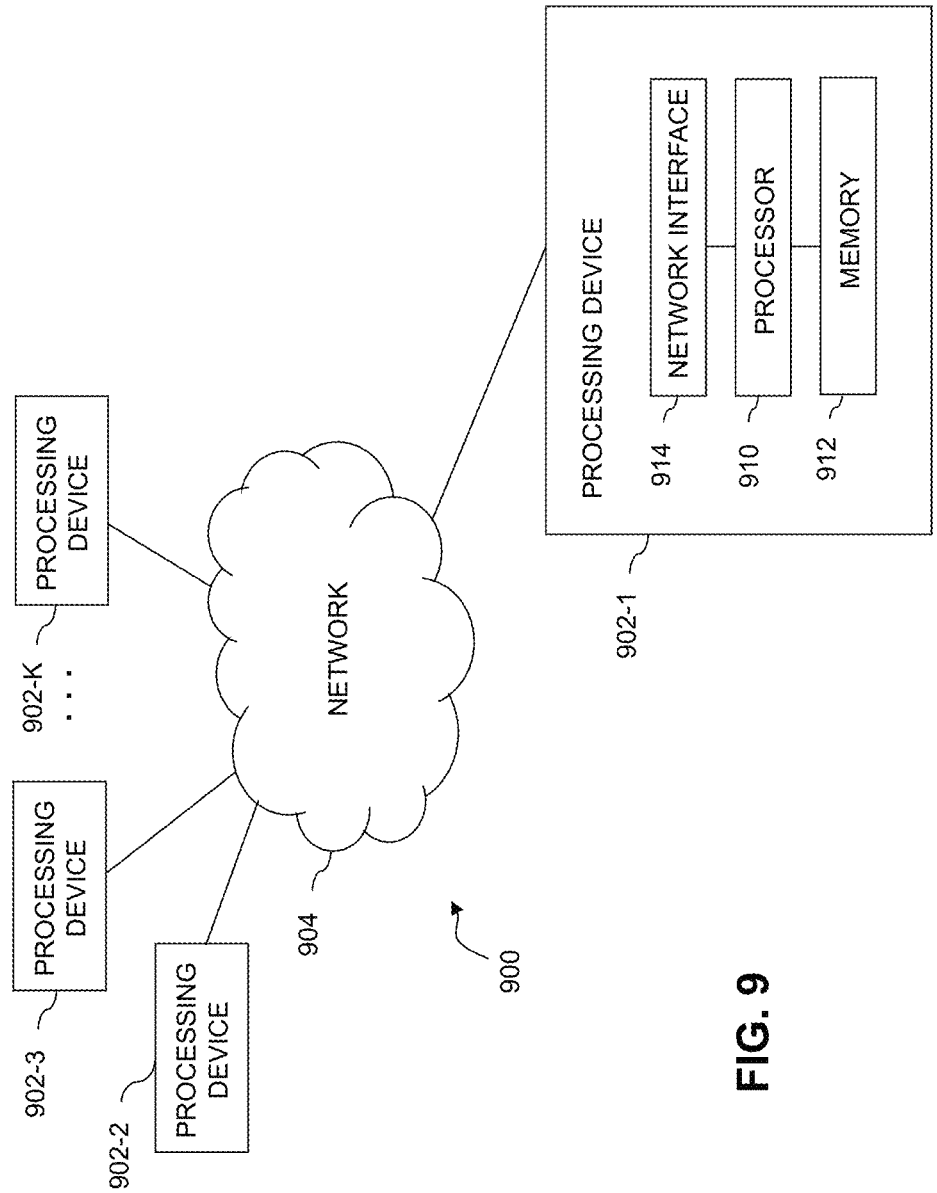

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912. The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the protocol prediction platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and protocol prediction platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
said at least one processing platform being configured:
to receive data collected from a plurality of managed devices in a plurality of data collections, wherein the plurality of data collections are performed using a plurality of collection protocols;
to determine, for given ones of the plurality of data collections, a trigger of a plurality of triggers that generated each of the given ones of the plurality of data collections;
to identify a collection protocol of the plurality of collection protocols used for each of the given ones of the plurality of data collections;
to determine one or more attributes of a plurality of attributes that have been collected using given ones of the plurality of collection protocols, wherein the plurality of attributes are of the plurality of managed devices;
to generate a mapping between the plurality of triggers, the plurality of collection protocols and the plurality of attributes using one or more machine learning algorithms;
to predict, using the generated mapping, one or more collection protocols of the plurality of collection protocols to use to collect data from one or more of the plurality of managed devices;
to receive at least one of an alert and a warning detected on the one or more of the plurality of managed devices; and
to identify one or more of the plurality of attributes corresponding to the at least one of the alert and the warning;
wherein the prediction of the one or more collection protocols to use to collect the data from the one or more of the plurality of managed devices is based on the identified one or more of the plurality of attributes corresponding to the at least one of the alert and the warning.

2. The apparatus of claim 1 wherein the plurality of collection protocols comprise one or more of Simple Network Management Protocol (SNMP), Representational State Transfer (REST) protocol, Secure Shell (SSH) protocol and port 443 protocol.

3. The apparatus of claim 1 wherein the plurality of triggers comprise one or more of a periodic collection, an alert-based collection and a user-initiated collection.

4. The apparatus of claim 1 wherein the plurality of attributes correspond to a plurality of components of the plurality of managed devices.

5. The apparatus of claim 1 wherein the mapping comprises a decision tree.

6. The apparatus of claim 5 wherein said at least one processing platform is further configured to determine a plurality of weights of given nodes of the decision tree.

7. The apparatus of claim 6 wherein the weights of the given nodes of the decision tree are based on at least one of a type of one or more of the plurality of triggers and a number of the plurality of attributes collected by given ones of the plurality of collection protocols.

8. The apparatus of claim 7 wherein said at least one processing platform is further configured to rank the predicted one or more collection protocols based on the weights of the given nodes.

9. The apparatus of claim 1 wherein said at least one processing platform is further configured to use map/reduce techniques to partition the received data collected from the plurality of managed devices into a plurality of fuzzy sets.

10. The apparatus of claim 1 wherein the data collected from the plurality of managed devices comprises system state information.

11. The apparatus of claim 1 wherein said at least one processing platform is further configured to rank the predicted one or more collection protocols based on a number of the identified one or more of the plurality of attributes able to be retrieved from the one or more of the plurality of managed devices using a given collection protocol of the predicted one or more collection protocols.

12. The apparatus of claim 1 wherein said at least one processing platform is further configured:
to receive at least one of error data and activity log data collected from the one or more of the plurality of managed devices; and
to apply the at least one of the error data and the activity log data to the one or more machine learning algorithms to generate the mapping.

13. The apparatus of claim 1 wherein said at least one processing platform is further configured:
to receive one or more technical support tickets corresponding to the one or more of the plurality of managed devices; and
to apply the one or more technical support tickets to the one or more machine learning algorithms to generate the mapping.

14. A method comprising:
receiving data collected from a plurality of managed devices in a plurality of data collections, wherein the plurality of data collections are performed using a plurality of collection protocols;
determining, for given ones of the plurality of data collections, a trigger of a plurality of triggers that generated each of the given ones of the plurality of data collections;
identifying a collection protocol of the plurality of collection protocols used for each of the given ones of the plurality of data collections;
determining one or more attributes of a plurality of attributes that have been collected using given ones of the plurality of collection protocols, wherein the plurality of attributes are of the plurality of managed devices;
generating a mapping between the plurality of triggers, the plurality of collection protocols and the plurality of attributes using one or more machine learning algorithms;
predicting, using the generated mapping, one or more collection protocols of the plurality of collection protocols to use to collect data from one or more of the plurality of managed devices;
wherein the mapping comprises a decision tree; and
determining a plurality of weights of given nodes of the decision tree, wherein the weights of the given nodes of the decision tree are based on at least one of a type of one or more of the plurality of triggers and a number of the plurality of attributes collected by given ones of the plurality of collection protocols;
wherein the method is performed by at least one processing platform comprising at least one processing device comprising a processor coupled to a memory.

15. The method of claim 14 further comprising ranking the predicted one or more collection protocols based on the weights of the given nodes.

16. The method of claim 14 further comprising using map/reduce techniques to partition the received data collected from the plurality of managed devices into a plurality of fuzzy sets.

17. A computer program product comprising a non-transitory processor-readable storage medium having stored therein program code of one or more software programs, wherein the program code when executed by at least one processing platform causes said at least one processing platform:
to receive data collected from a plurality of managed devices in a plurality of data collections, wherein the plurality of data collections are performed using a plurality of collection protocols;
to determine, for given ones of the plurality of data collections, a trigger of a plurality of triggers that generated each of the given ones of the plurality of data collections;
to identify a collection protocol of the plurality of collection protocols used for each of the given ones of the plurality of data collections;
to determine one or more attributes of a plurality of attributes that have been collected using given ones of the plurality of collection protocols, wherein the plurality of attributes are of the plurality of managed devices;
to generate a mapping between the plurality of triggers, the plurality of collection protocols and the plurality of attributes using one or more machine learning algorithms;
to predict, using the generated mapping, one or more collection protocols of the plurality of collection protocols to use to collect data from one or more of the plurality of managed devices;
wherein the mapping comprises a decision tree; and
to determine a plurality of weights of given nodes of the decision tree, wherein the weights of the given nodes of the decision tree are based on at least one of a type of one or more of the plurality of triggers and a number of the plurality of attributes collected by given ones of the plurality of collection protocols.

18. The computer program product according to claim 17 wherein the program code further causes said at least one processing platform to rank the predicted one or more collection protocols based on the weights of the given nodes.

19. The computer program product according to claim 17 wherein the program code further causes said at least one processing platform to use map/reduce techniques to partition the received data collected from the plurality of managed devices into a plurality of fuzzy sets.

20. The computer program product according to claim 17 wherein the program code further causes said at least one processing platform:
to receive at least one of error data and activity log data collected from the one or more of the plurality of managed devices; and to apply the at least one of the error data and the activity log data to the one or more machine learning algorithms to generate the mapping.

\* \* \* \* \*